United States Patent
Ganguly et al.

(10) Patent No.: US 10,465,985 B2
(45) Date of Patent: Nov. 5, 2019

(54) BULK FREEZE DRYING USING SPRAY FREEZING AND AGITATED DRYING WITH DIELECTRIC HEATING

(71) Applicant: IMA LIFE NORTH AMERICA INC., Tonawanda, NY (US)

(72) Inventors: Arnab Ganguly, Williamsville, NY (US); Francis W. Demarco, Niagara Falls, NY (US); Ernesto Renzi, Youngstown, NY (US); David Debo, Batavia, NY (US)

(73) Assignee: IMA LIFE NORTH AMERICA INC., Tonawanda, NY (US)

( * ) Notice: Subject to any disclaimer, the term of this patent is extended or adjusted under 35 U.S.C. 154(b) by 38 days.

(21) Appl. No.: 15/573,718

(22) PCT Filed: May 25, 2016

(86) PCT No.: PCT/US2016/034061
§ 371 (c)(1),
(2) Date: Nov. 13, 2017

(87) PCT Pub. No.: WO2016/196110
PCT Pub. Date: Dec. 8, 2016

(65) Prior Publication Data
US 2018/0120027 A1    May 3, 2018

Related U.S. Application Data

(60) Provisional application No. 62/169,098, filed on Jun. 1, 2015.

(51) Int. Cl.
F26B 5/06    (2006.01)
A23L 3/44    (2006.01)
F26B 3/28    (2006.01)

(52) U.S. Cl.
CPC ............ F26B 5/065 (2013.01); A23L 3/44 (2013.01); F26B 3/28 (2013.01)

(58) Field of Classification Search
CPC ............. F26B 5/065; F26B 3/28; A23L 3/04
See application file for complete search history.

(56) References Cited

U.S. PATENT DOCUMENTS 2,535,109 A * 12/1950 Wigton ................. F26B 17/006
                                                    209/11
3,293,766 A    12/1966 Togashi et al.
3,300,868 A    1/1967 Anderwert
(Continued)

FOREIGN PATENT DOCUMENTS

DE    102010024917 A1    12/2011
EP         1267138 A1    12/2002
(Continued)

Primary Examiner — Jessica Yuen

(57) ABSTRACT

A freeze dryer processes aseptic bulk powder products. The freeze dryer freezes the product by mixing an atomized spray of product with sterile liquid nitrogen to produce a frozen powder. The frozen powder is freeze dried in a vessel by dielectrically heating the frozen powder using electromagnetic radiation such as microwave radiation or infrared radiation, and the frozen powder is continuously agitated using a sterilizable apparatus such as a series of vibrating shelves to maintain even heating and to prevent agglomeration.

27 Claims, 8 Drawing Sheets

(56) References Cited

U.S. PATENT DOCUMENTS

| | | | |
|---|---|---|---|
| 3,445,247 A | | 5/1969 | Baerwald |
| 3,601,901 A | | 8/1971 | Rader |
| 3,749,378 A | | 7/1973 | Rhodes |
| 3,788,095 A | | 1/1974 | Murphy et al. |
| 4,033,048 A | | 7/1977 | Van Ike |
| 5,131,170 A | | 7/1992 | Rilke |
| 5,919,506 A | * | 7/1999 | Ruozzi .............. A23B 4/00 34/263 |
| 6,584,782 B2 | | 7/2003 | Leuenberger et al. |
| 7,836,606 B2 | | 11/2010 | Gehrmann et al. |
| 8,341,854 B2 | | 1/2013 | Ogata et al. |
| 8,978,268 B2 | | 3/2015 | Itou et al. |
| 9,920,989 B2 | | 3/2018 | Luy et al. |
| 2012/0030963 A1 | | 9/2012 | Durance et al. |
| 2013/0118026 A1 | | 5/2013 | DeMarco et al. |
| 2014/0230266 A1 | | 8/2014 | Luy et al. |
| 2014/0237846 A1 | | 8/2014 | Luy et al. |
| 2015/0226478 A1 | | 8/2015 | DeMarco et al. |

FOREIGN PATENT DOCUMENTS

| | | |
|---|---|---|
| EP | 2101131 A1 | 9/2009 |
| EP | 2320184 A1 | 5/2011 |
| GB | 948517 A | 2/1964 |
| GB | 1325785 A | 8/1973 |
| WO | 2012087232 A1 | 6/2012 |

* cited by examiner

BULK FREEZE DRYING USING SPRAY FREEZING AND AGITATED DRYING WITH DIELECTRIC HEATING

PRIORITY CLAIM

This application claims the benefit of U.S. Provisional Application No. 62/169,098, filed Jun. 1, 2015, entitled "Microwave Bulk Freeze Drying Using Spray Freezing and Agitated Drying," which is incorporated herein by reference in its entirety.

This application is also a continuation-in-part of U.S. patent application Ser. No. 14/678,385, filed Apr. 3, 2015, entitled "Bulk Freeze Drying Using Spray Freezing and Agitated Drying," which is a continuation-in-part of U.S. patent application Ser. No. 13/811,937, filed Jan. 24, 2013, entitled "Bulk Freeze Drying Using Spray Freezing and Stirred Drying," now U.S. Pat. No. 9,052,138, issued Jun. 9, 2015, which is a section 371 U.S. national phase application of International Application No. PCT/US2010/002167, filed Apr. 8, 2010, entitled "Bulk Freeze Drying Using Spray Freezing and Stirred Drying," the disclosures of which are incorporated herein by reference in their entirety.

FIELD OF THE INVENTION

The present disclosure relates generally to freeze drying processes and equipment for removing moisture from a product using vacuum and low temperature. More specifically, the invention relates to the freeze drying of bulk powder and especially pharmaceutical products and other bulk powder products, including those requiring aseptic handling.

BACKGROUND

Freeze drying is a process that removes a solvent or suspension medium, typically water, from a product. While the present disclosure uses water as the exemplary solvent, other solvents, such as alcohol, may also be removed in freeze drying processes and may be removed with the presently disclosed methods and apparatus.

In a freeze drying process for removing water, the water in the product is frozen to form ice and, under vacuum, the ice is sublimed and the vapor flows to a condenser. The water vapor is condensed on the condenser as ice and is later removed from the condenser. Freeze drying is particularly useful in the pharmaceutical industry, as the integrity of the product is preserved during the freeze drying process and product stability can be guaranteed over relatively long periods of time. The freeze dried product is ordinarily, but not necessarily, a biological substance.

Pharmaceutical freeze drying is often an aseptic process that requires sterile conditions within the freezing and drying chambers. It is critical to assure that all components of the freeze drying system coming into contact with the product are sterile.

Most bulk freeze drying in aseptic conditions is done in a freeze dryer wherein bulk product is placed in trays. In one example of a prior art freeze drying system 100 shown in FIG. 1, a batch of product 112 is placed in freeze dryer trays 121 within a freeze drying chamber 110. Freeze dryer shelves 123 are used to support the trays 121 and to transfer heat to and from the trays and the product as required by the process. A heat transfer fluid flowing through conduits within the shelves 123 may be used to remove or add heat.

Under vacuum, the frozen product 112 is heated slightly to cause sublimation of the ice within the product. Water vapor resulting from the sublimation of the ice flows through a passageway 115 into a condensing chamber 120 containing condensing coils or other surfaces 122 maintained below the condensation temperature of the water vapor. A coolant is passed through the coils 122 to remove heat, causing the water vapor to condense as ice on the coils.

Both the freeze drying chamber 110 and the condensing chamber 120 are maintained under vacuum during the process by a vacuum pump 150 connected to the exhaust of the condensing chamber 120. Non-condensable gases contained in the chambers 110, 120 are removed by the vacuum pump 150 and exhausted at a higher pressure outlet 152.

Tray dryers are typically designed for aseptic vial drying and are not optimized to handle bulk product. Bulk product must be manually loaded into the trays, freeze dried, and then manually removed from the trays. Handling the trays is difficult, and creates the risk of a liquid spill. Heat transfer resistances between the product and the trays, and between the trays and the shelves, sometimes causes irregular heat transfer. Dried product must be removed from trays after processing, resulting in product handling loss.

Because the process is performed on a large mass of product, agglomeration into a "cake" often occurs, and milling is required to achieve a suitable powder and uniform particle size. Cycle times may be longer than necessary due to resistance of the large mass of product to heating and the poor heat transfer characteristics between the trays, the product and the shelves.

Various alternatives to tray dryers have been tried, often involving moving parts within the vacuum dryers. Those arrangements present problems in aseptic applications because metal-to-metal moving contact such as sliding or rolling produces small metal particles that cannot be easily sterilized, and because moving mechanical elements such as bearings and bushings have hidden surfaces and are difficult to sterilize.

There is a need for an improved technique for processing bulk quantities of aseptic materials that are not contained in vials. The technique should maintain an aseptic environment for the process, and minimize handling of the product in trays, with the potential of spills. The process should avoid secondary operations such as milling to produce uniform particle sizes. The process should avoid the heat transfer problems associated with drying bulk product on trays. The process should be as continuous as possible, avoiding product transfer between equipment wherever possible.

SUMMARY

The present disclosure addresses the needs described above by providing a freeze drying system for freeze drying a bulk product. The system includes a freezing chamber and at least one spray nozzle directed to an interior of the freezing chamber. The at least one spray nozzle is connected for spraying the bulk product and a freezing agent to create a spray-frozen powder.

The system further includes a vacuum drying chamber and a connection between the freezing chamber and the vacuum drying chamber for transferring spray frozen powder and for pressure isolation of the freezing chamber from the vacuum drying chamber. An agitating mechanism agitates the spray-frozen powder in the vacuum drying chamber by continuously moving particles of the spray-frozen powder relative to adjacent particles.

A heat source dielectrically heats the spray-frozen powder. The freeze drying system further includes a sterilization system for sterilizing components of the agitating mechanism within the vacuum drying chamber. A vacuum pump is connected for evacuating the vacuum drying chamber.

The agitating mechanism may include a plurality of shelves arranged within the vacuum drying chamber for conducting the spray-frozen powder from shelf to shelf, and a vibrating mechanism located outside the vacuum drying chamber and linked for transmitting vibrations to the shelves to transport the spray frozen powder relative to the shelves.

Another embodiment of the invention is a method for freeze drying a bulk product containing a liquid. The method comprises spraying the bulk product and a freezing agent into a freezing chamber, the freezing chamber being at a first pressure, the freezing agent intermingling with the sprayed bulk product to freeze the liquid contained in the bulk product to form a spray-frozen powder in the freezing chamber.

The spray-frozen powder is then transferred from the freezing chamber to a plurality of shelves in a vacuum drying chamber, and the vacuum drying chamber is subjected to a vacuum pressure lower than the first pressure. The spray-frozen powder is agitated under the vacuum pressure in the vacuum drying chamber to continuously move particles of the spray-frozen powder relative to adjacent particles, by vibrating the plurality of shelves using a vibrating mechanism located outside the vacuum drying chamber to cause the spray-frozen powder to advance from shelf to shelf.

During the operation of agitating the spray-frozen powder under the vacuum pressure in the vacuum drying chamber, the spray-frozen powder is dielectrically heated to cause sublimation of frozen liquid to form a freeze dried product. The freeze dried product is removed from the vacuum drying chamber, and components within the vacuum drying chamber are sterilized.

Transferring the frozen powder to the vacuum drying chamber may include transferring from the freezing chamber to a plurality of shelves in a vacuum drying chamber. In that case, agitating may be performed by vibrating the plurality of shelves using a vibrating mechanism located outside the vacuum drying chamber to cause the spray-frozen powder to advance from shelf to shelf.

DESCRIPTION

Figure 1:
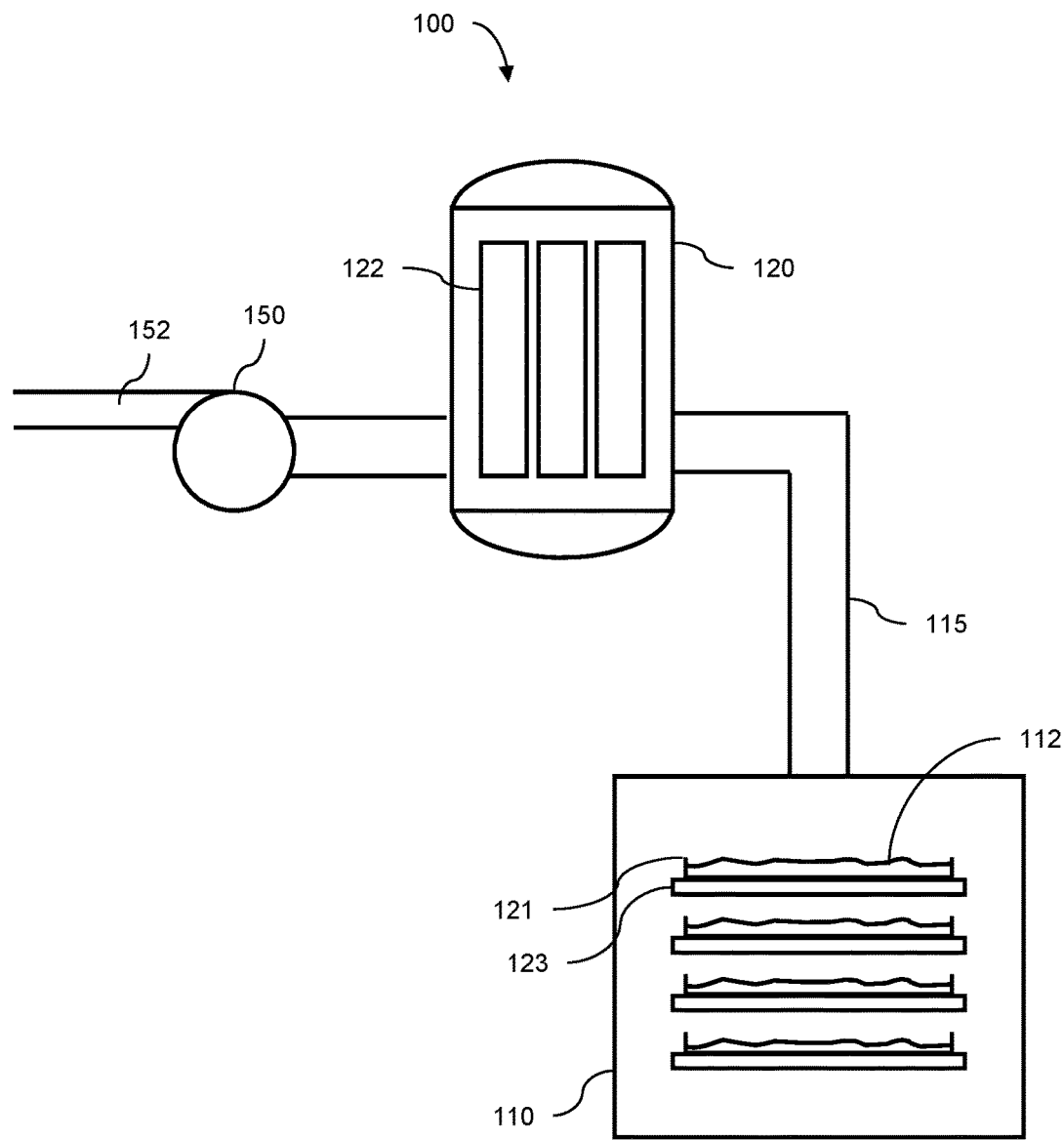
FIG. 1 is a schematic drawing of a prior art freeze drying system.

The present disclosure describes systems and methods for freeze drying an aseptic bulk product in an efficient manner, without compromising the aseptic qualities of the product. More specifically, the systems and methods of the present disclosure are directed to a bulk powder freeze dryer that is optimized to freeze and dry product in the powder form.

The processes and apparatus may advantageously be used in drying pharmaceutical products that require aseptic or sterile processing, such as injectables. The methods and apparatus may also be used, however, in processing materials that do not require aseptic processing, but require moisture removal while preserving structure, and require that the resulting dried product be in powder form. For example, ceramic/metallic products used as superconductors or for forming nanoparticles or microcircuit heat sinks may be produced using the disclosed techniques.

The methods described herein may be performed in part by an industrial controller and/or computer used in conjunction with the processing equipment described below. The equipment is controlled by a programmable logic controller (PLC) that has operating logic for valves, motors, etc. An interface with the PLC is provided via a PC. The PC loads a user-defined recipe or program to the PLC to run. The PLC will upload to the PC historical data from the run for storage. The PC may also be use for manually controlling the devices, operating specific steps such as freezing, defrost, steam in place, etc.

The PLC and the PC include central processing units (CPU) and memory, as well as input/output interfaces connected to the CPU via a bus. The PLC is connected to the processing equipment via the input/output interfaces to receive data from sensors monitoring various conditions of the equipment such as temperature, position, speed, flow, etc. The PLC is also connected to operate devices that are part of the equipment.

The memory may include random access memory (RAM) and read-only memory (ROM). The memory may also include removable media such as a disk drive, tape drive, etc., or a combination thereof. The RAM may function as a data memory that stores data used during execution of programs in the CPU, and is used as a work area. The ROM may function as a program memory for storing a program including the steps executed in the CPU. The program may reside on the ROM, and may be stored on the removable media or on any other non-volatile computer-usable medium in the PLC or the PC, as computer readable instructions stored thereon for execution by the CPU or other processor to perform the methods disclosed herein.

The presently described methods and apparatus utilize spray freezing by combining an atomized liquid product (through spray nozzles) with atomized liquid nitrogen (LN2) or another freezing agent. In cases where the presently described systems and methods are used in the processing of products requiring sterile or aseptic processing, sterile LN2 is used. One technique for the production of sterile liquid nitrogen is described in PCT International Publication No. WO 2009/029749A1, assigned to Linde, Inc. of Murray Hill, N.J., USA.

Figure 2:
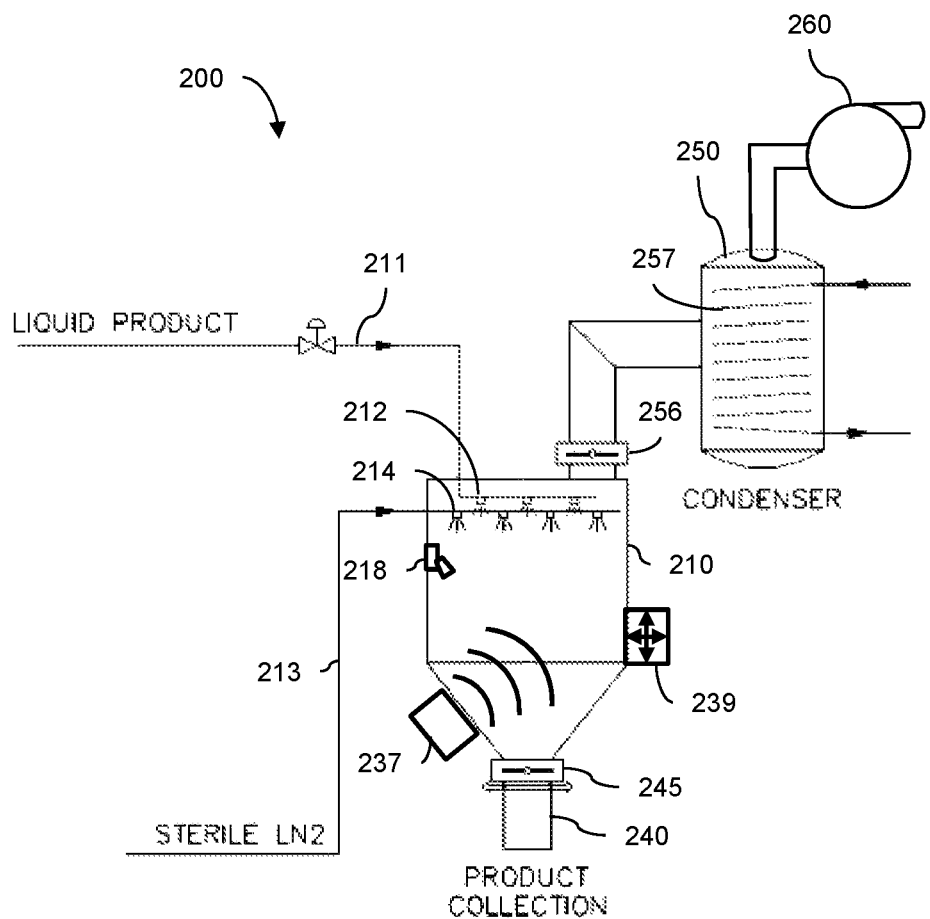
FIG. 2 is a schematic drawing of a freeze drying system according to one embodiment of the disclosure.

An exemplary system 200 in accordance with one disclosed embodiment is shown in FIG. 2. Spray nozzles 212 are connected to a source 211 of liquid product. The nozzles are arranged to atomize the product within a freeze drying vessel 210. The liquid product may be a solution or a suspension of a biological solid in water or another liquid. The atomization of the product results in a dispersion of fine particles within the freeze drying vessel 210.

Both the size of the particles and the distribution of particle sizes are dependent on the spraying technology. For example, nozzle geometry, product flow rate and nozzle placement within the chamber may influence those process outputs. Particle size and size distribution are important to the application of the product. For example, for powder handling, it is preferable to have particle sizes above 100 microns, while for pulmonary applications, particle size should be around 5-30 microns.

Another set of spray nozzles 214 is arranged to comingle a spray of an aseptic freezing agent such as sterile LN2 with the atomized liquid product. The atomized liquid product freezes as the sterile LN2 vaporizes and absorbs heat from the liquid product within the freeze drying vessel 210. The spray nozzles 214 are connected to a source 213 of the aseptic freezing agent. In the example shown, sterilized LN2 is used. The use of sterile LN2 as the cold source makes possible the direct contact of aseptic atomized product with the cold source or freezing agent, without contamination. One skilled in the art will recognize that other freezing agents, such as cold sterile gaseous nitrogen or another cold sterile gas may be used in place of LN2.

The dimensions of the freezing chamber are such that a sufficient amount of time is allowed for the product to be in contact with the freezing agent to allow freezing of the product before it reaches the bottom of the chamber. In the embodiment shown in FIG. 2, the spray-frozen liquid product collects at the bottom of the freeze drying vessel 210 as a frozen powder, while the gaseous freezing agent is vented from the vessel. Baffles may be used in the freeze drying vessel to allow the particles to settle to the bottom without becoming entrained in the vented gas. The spray freezing process produces small particles of product that are quickly frozen because the smaller particles have much larger surface area to mass ratio and therefore a minimal resistance to heat transfer. That property also speeds the drying process.

Spray freeze drying has been suggested, wherein a liquid substance is sprayed into a low temperature, low pressure environment, and water in the resulting frozen particles is sublimated by exposing the falling particles to radiant heat from the chamber walls (see, e.g., U.S. Pat. No. 3,300,868). That process is limited to materials from which water may be removed rapidly, while the particles are airborne, and requires radiant heaters in a low temperature environment, reducing efficiency. Freezing and drying are performed at a single pressure, preventing optimization of the two operations.

The freeze drying vessel 210 may be pre-cooled to prevent frozen particulates from thawing upon contact with vessel walls or ancillary parts. The freeze drying vessel 210 may also be cooled during the spraying and subsequent steps to maintain the powder in frozen form as additional product is sprayed and frozen in the vessel. The vessel may be cooled, at least in part, by passing a cooled heat exchange fluid such as oil through heat exchangers cooled using vented gas from production of the freezing agent. The vessel may furthermore have a conical lower section to facilitate handling of the product. The freezing step is complete when a sufficient quantity of liquid product is spray-frozen and has been collected as frozen product in the lower part of the vessel 210. A vacuum is then applied to the freeze drying vessel 210. A vacuum pump 260 may be in communication with a condenser 250 that, in turn, may be connected to the freeze drying vessel 210 by opening a valve 256. In that case, the freeze drying vessel 210 is subjected to vacuum pressure by operating the vacuum pump 260 and opening the valve 256 between the condenser 250 and the freeze drying vessel 210. The drying operation may therefore be performed at a much lower pressure than is used in the freezing operation.

After the chamber is evacuated, the frozen product is dielectrically heated slightly to induce sublimation. In the embodiment shown, a source 237 of electromagnetic energy is activated, subjecting the frozen product to an electromagnetic field. In embodiments, the field may be a microwave field. In other embodiments, the field may be an infrared field. One skilled in the art will recognize that electromagnetic fields of other frequencies may be used without departing from the scope of the disclosure. The source 237 of electromagnetic energy is mounted externally on the vessel 210, and may use wave guides (not shown) to direct the electromagnetic radiation through an aperture in the vessel wall to the interior of the vessel 210. The source of electromagnetic radiation may alternatively be mounted within the vessel as described below with reference to FIG. 5.

To move the particles of the frozen product relative to each other for even heating, while preventing product agglomeration from occurring, the frozen powder is agitated. In one embodiment, a vibration-inducing element 239 is attached to a wall of the freeze drying vessel 210 and causes the walls of the vessel to vibrate, causing the frozen powder to circulate toward and away from the vessel wall. The vibration-inducing element may, for example, be a pneumatic piston impact vibrator or may be an offset mass driven by an electric motor. The vibration-inducing element may alternatively be mounted on a supporting leg (not shown) of the freeze drying vessel. In another embodiment, the vessel is tumbled, inducing the powder to circulate.

As frozen liquid in the product sublimates, vapor is carried through the valve 256 into the condensing vessel 250. Cooled condensing surfaces 257 in the condensing vessel collect the condensed vapor. In the case of water vapor, the vapor condenses as ice. The condensed ice is periodically removed from the condensing vessel.

After completion of the drying step, the freeze drying vessel 210 is returned to atmospheric pressure and a valve 245 at the bottom of the drying chamber opens to allow the dried product to move through a collection valve or plate to a removable collection canister 240. Unlike a traditional tray freeze dryer system, handling of the freeze dried product is minimized, and transfer from the vessel to the collection canister may take place in a controlled, aseptic environment.

The freeze drying system 200 provides a bulk freeze dryer having a larger throughput and easier product collection than previous freeze drying solutions such as tray dryers. The technique permits the spray-freezing of product in a sterile freeze drying operation. No known prior sterile freeze drying methods utilize spray freezing.

A washing nozzle 218 directs a liquid sanitizer on the inside vessel walls and components as the nozzle rotates. The complete interior of the vessel 210 may be sterilized via hot water/steam, vaporized hydrogen peroxide (VHP), or another sterilizing agent. Because all components that contact the product are enclosed within the freeze drying vessel, and the vessel need not be opened after each cycle, sterilization may not be necessary after each cycle. The source 237 of electromagnetic energy and the vibration inducing element 239 are both shown in FIG. 2 as comprising components that are located outside the vessel 210. One or both of those elements may comprise components located within the vessel 210, in which case the components within the vessel are sterilized using the washing nozzle 218. Components located within the vessel 210 have characteristics facilitating sterilization. Those characteristics may include exposed product contact surfaces, smooth surface finishes and a tolerance for heat or chemical sterilizing agents.

Figure 3:
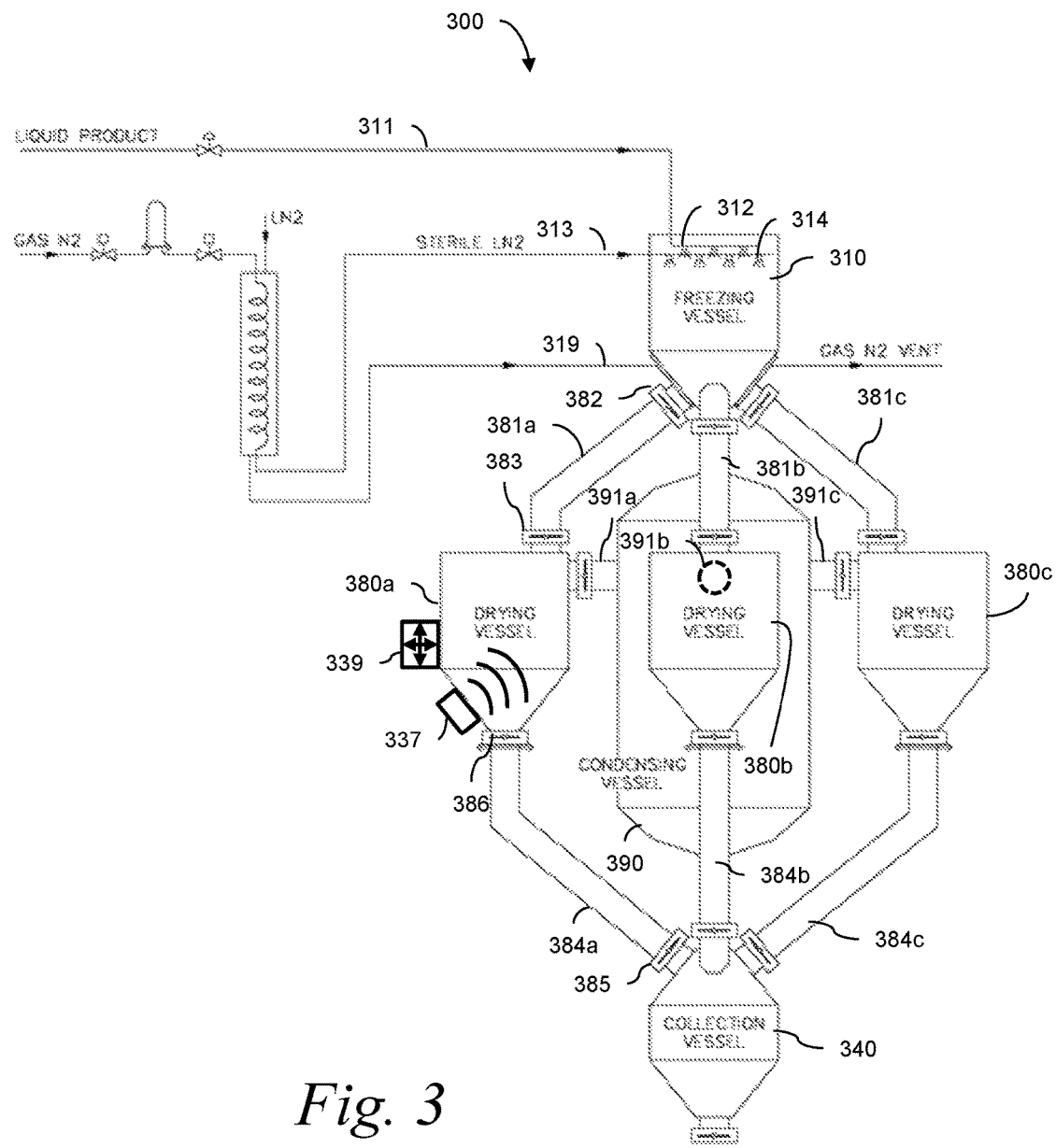
FIG. 3 is a schematic view of a freeze dryer with multiple vacuum drying chambers according to one embodiment of the disclosure.

Another embodiment 300 of the disclosed freeze dryer, shown in FIG. 3, includes a separate freezing vessel 310 that feeds several drying vessels 380a, 380b, 380c arranged in parallel. The freezing vessel 310 operates in a manner similar to that described above with reference to FIG. 2. Spray nozzles 312 are connected to a source 311 of liquid product. The nozzles 312 are arranged to atomize the product within the freezing vessel 310. Another set of spray nozzles 314 is arranged to comingle a spray of an aseptic freezing agent such as sterile LN2 with the atomized liquid product. Liquid in the atomized product freezes as the sterile LN2 vaporizes and absorbs heat from the product, before the product reaches the floor of the freeze drying vessel 310. The spray nozzles 312 are connected to a source 313 of the aseptic freezing agent. The freezing vessel 310 may be cooled using a coolant 319 that is chilled using vented gas from production of the freezing agent.

Each drying vessel 380a, 380b, 380c is selectively interconnected with the freezing vessel 310 by respective passageways 381a, 381b, 381c. The drying vessels may be selected for receiving frozen product from the freezing vessel 310 by opening valves at each end of the corresponding passageways. For example, drying vessel 380a is selected by opening the valves 382, 383 at each end of the passageway 381a. Valves in the remaining passageways 381b, 381c remain closed as the drying vessel 380a receives product from the freezing vessel 310, and while the other drying vessels 380b, 380c undergo vacuum drying and unloading. The other drying vessels 380b, 380c are selected to receive product in a manner similar to that described for drying vessel 380a.

The drying vessels 380a, 380b, 380c function as described above with reference to FIG. 2. For example, regarding drying vessel 380a, an electromagnetic energy source 337 is positioned for dielectrically heating the frozen powder. A vibration-inducing element 339 moves particles of the frozen product relative to each other for even heating, while preventing product agglomeration from occurring.

One or more condensing vessels 390 are in communication with the drying vessels through conduits 391a, 391b, 391c. A vacuum pump (not shown) is connected to the condensing vessel and maintains selected drying vessels at vacuum pressure during processing. In a preferred embodiment of the disclosed system, at least two parallel condensing vessels 390 are used in the system, with each drying vessel 380a, 380b, 380c being alternatively connectable to more than one condensing vessel. That arrangement permits a condensing vessel to be taken off line for defrosting while continuing to direct effluent from the drying vessels to an alternate condensing vessel.

Upon completion of the drying cycle, the product may be released through passageways 384a, 384b, 384c to a common collection vessel 340. Each passageway has valves 385, 386 at the ends for selectively connecting the collection vessel 340 with a particular drying vessel. Alternatively, each drying vessel 380a, 380b, 380c may have a dedicated collection vessel (not shown).

Because drying is a more time-consuming step than freezing, individual batches being processed by the freeze drying system 300 are in different stages of drying. For example, as a batch of frozen product is being transferred from the freezing vessel 310 to the drying vessel 380a, another batch of product that had earlier been transferred to drying vessel 380b might be undergoing dielectric heating/sublimation in the drying vessel, while yet another batch that had been transferred even earlier to drying vessel 380c might have completed drying and repressurization, and be in the process of transfer to the collection vessel 340. In that way, the freezing vessel output is processed in staggered batches, allowing full utilization of both the freezing vessel and the drying vessel.

The freeze drying system 300 permits the freeze drying process to run semi-continuously, with the spray freezing process operating continuously and the drying process being divided into parallel vessels that process successive, staggered batches, resulting in continuously filling the collection vessel. Condensing vessels may be taken off line and defrosted without interrupting the continuous process. In one example, a batch portion of frozen powder is produced and transferred from the freezing chamber to a first vacuum drying chamber, and, in the first vacuum drying chamber, the frozen powder is subjected to vacuum, agitated and heated. A second batch of the frozen powder is produced and transferred from the freezing chamber to a second vacuum drying chamber, and, in the second vacuum drying chamber, is subjected to vacuum, stirred and heated. The processing in the first and second vacuum drying chambers is staggered to sequentially draw from the freezing vessel. A sufficient number of additional drying vessels may be used to keep the freezing vessel operating continuously.

Figure 4:
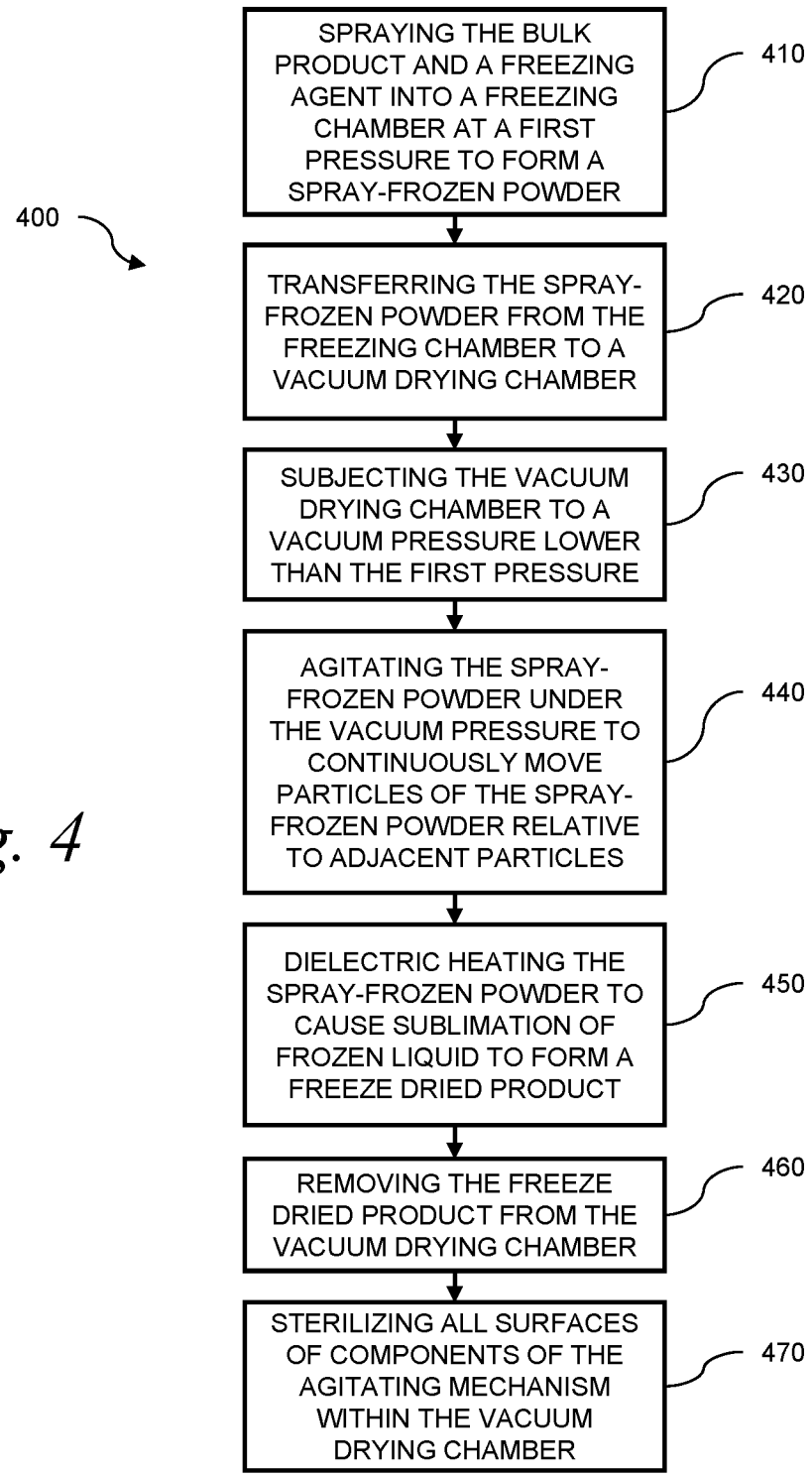
FIG. 4 is a flow chart showing a method in accordance with one aspect of the disclosure.

Also presently disclosed and shown schematically in FIG. 4 is a unique freeze drying method 400 for use in drying a bulk product containing a liquid solvent, under aseptic conditions. The liquid solvent may be water, alcohol or another solvent. The bulk product is sprayed together with a freezing agent into a freezing chamber at a first pressure in operation 410. The freezing agent may be sterile LN2. The bulk product and the freezing agent intermingle, and the liquid freezing agent quickly evaporates, absorbing heat from the sprayed bulk product and causing the solvent in the bulk product to freeze. A spray-frozen powder is formed before the bulk product reaches a lower portion of the freezing chamber. The bulk product and the freezing agent may be sprayed from separate nozzles to comingle in the freezing chamber, or may be combined before spraying from a single nozzle.

The spray-frozen powder is then transferred from the freezing chamber at operation 420 to a vacuum drying chamber to undergo additional operations. In embodiments, the spray frozen powder is transferred to a plurality of shelves in the vacuum drying chamber, as described below with reference to FIG. 5. At operation 430, the vacuum drying chamber is then subject to a vacuum pressure lower than the first pressure.

The spray-frozen powder is agitated at operation 440 under the vacuum pressure in the vacuum drying chamber using an agitating mechanism to continuously move particles of the spray-frozen powder relative to adjacent particles. In embodiments, agitating the spray-frozen powder further includes supporting the product on a plurality of shelves, and vibrating the plurality of shelves using a vibrating mechanism located outside the vacuum drying chamber to cause the spray-frozen powder to advance from shelf to shelf. As the spray-frozen powder is agitated, it is dielectrically heated at operation 450 using electromagnetic radiation to cause sublimation of frozen liquid to form a freeze dried product. A source of the electromagnetic radiation may be located within the vacuum drying chamber.

The freeze dried product is removed from the vacuum drying chamber at operation 460, and surfaces of components of the agitating mechanism within the vacuum drying chamber are sterilized at operation 470.

Figure 5:
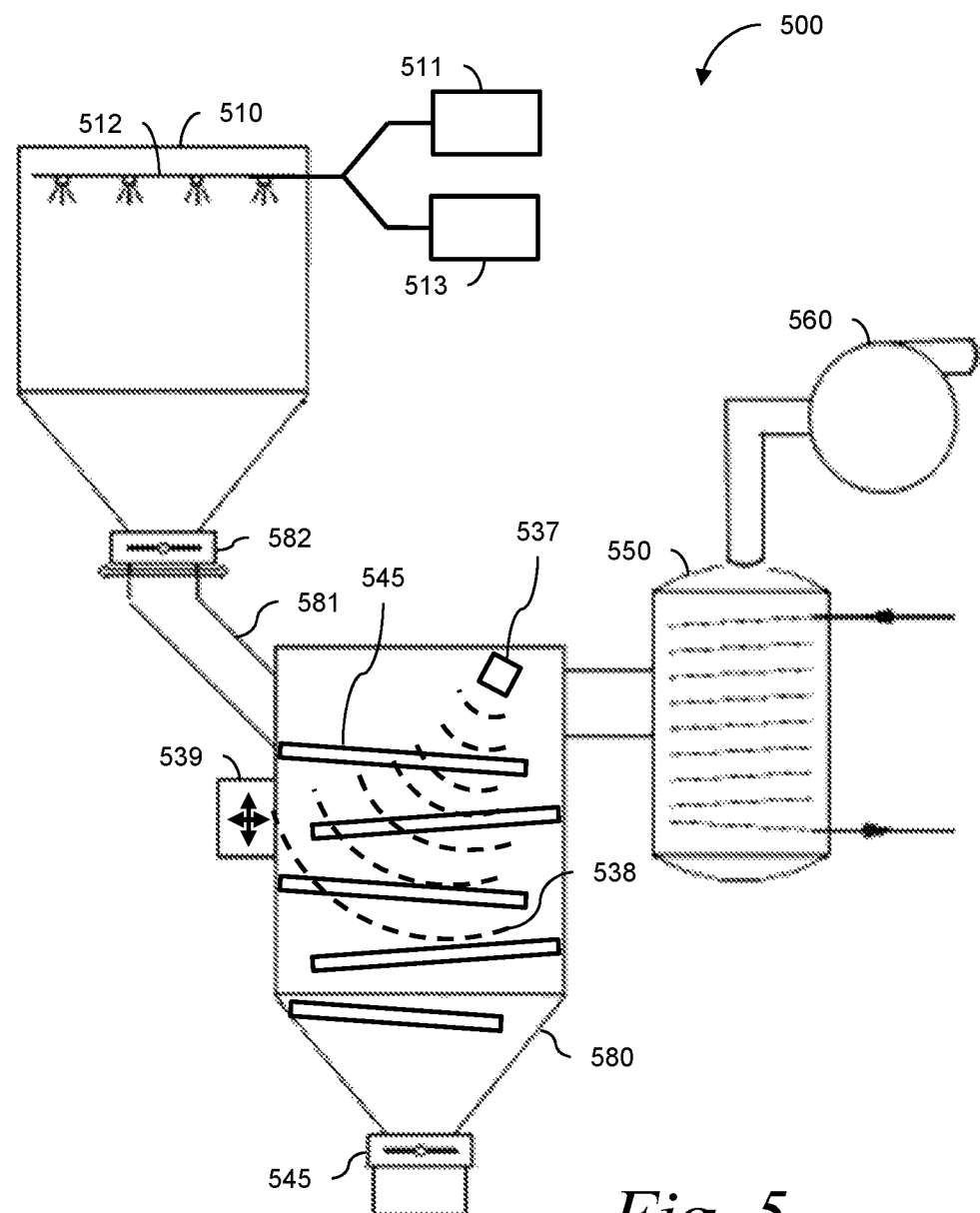
FIG. 5 is a schematic drawing of a freeze drying system according to one aspect of the disclosure.

An exemplary system 500 in accordance with embodiments of the disclosure is shown in FIG. 5. The system 500 utilizes several of the components and arrangements disclosed above with reference to FIGS. 2 and 3, and in addition utilizes an improved agitation mechanism that includes a series of shelves 545 to guide the spray-frozen powder through the electromagnetic field 538 in a drying chamber 580.

Spray nozzles 512 are arranged to atomize the product together with an aseptic freezing agent such as sterile LN2. The product from a source 511 and the freezing agent from a source 513 may be sprayed together from each of one or more nozzles 512 as shown, or each of the freezing agent and product may be sprayed from separate nozzles such as the nozzles 212, 214 shown in FIG. 2. The atomized liquid product freezes in the freezing chamber 510. The spray-frozen product falls to the bottom of the freezing chamber as a frozen powder.

A selectively closeable passageway or conduit 581 interconnects the freezing chamber 510 with the drying chamber 580. The passageway 581 is selectively closeable by means of a valve 582 or other means that, when closed, is capable of maintaining a pressure differential between the freezing chamber 510 and the drying chamber 580. When open, the passageway 581 allows spray-frozen powder to be moved by gravity from one chamber to the other, or by a mechanical means such as an auger or a conveyor, or by entraining in a gas stream, or by a combination of those or other techniques. When closed, the selectively closeable conduit permits different, parallel operations to be performed in the two chambers 510, 580. For example, while spraying or sterilizing takes place in the freezing chamber 510, a drying operation may take place in the drying chamber 580.

In some embodiments, the selectively closeable conduit connecting the freezing chamber 510 with the vacuum drying chamber 580 may be toggled between a closed configuration and an open configuration. In that case, the product may accumulate in a lower portion of the freezing chamber 510, with the passageway 581 remaining closed during the freezing process. The conduit is then opened to allow product transfer to the drying chamber 580 after a sufficient quantity of product is spray-frozen. The transferring may take place by gravity using an arrangement similar to that shown in FIG. 5, or may take place via an active product transfer device such as an auger or a vibratory conveyor. During the freezing step, the valve 582 remains closed. After the freezing step, the valve 582 may be momentarily opened to admit the frozen product through the passageway 581 into the drying chamber 580 with or without interrupting the drying operation.

Another selectively closeable conduit arrangement 600 for transferring frozen product from a freezing chamber 610 to a vacuum drying chamber 680 is discussed with reference to FIG. 6. A transfer disk 640 has one or more transfer cavities 641 on its periphery. The periphery of the transfer disk seals with a sealing block 642 such that the atmospheric freezing chamber 610 is isolated from the vacuum pressure freezing chamber 680. As frozen product falls to the bottom of the freezing chamber, the product enters a transfer cavity 641. The transfer disk rotates, bringing the transfer cavity into communication with an evacuation channel 646 which lowers pressure in the cavity to approximately that of the vacuum drying chamber 680. The transfer disk continues to rotate, bringing the cavity into communication with the vacuum drying chamber 680 and transferring the frozen product into the chamber. As the cavity returns to communicate with the freezing chamber 610, it may be repressurized by a pressurization channel 645. The arrangement 600 permits continuous functioning of the freezing and drying operations at different pressures. While the freezing chamber 610 is maintained at atmospheric pressure, the drying chamber 680 may be held at pressures low enough to promote sublimation. In one example, the pressure in the vacuum drying chamber is maintained at less than 500 mTorr. Other pressures may be used without departing from the scope of the present disclosure.

Returning to FIG. 5, the drying chamber 580 is subjected to vacuum by a vacuum pump 560 that may be in communication with a condenser 550 that, in turn, may be connected to the drying chamber 580. Sublimated solvent from the drying chamber 580 is solidified in the condenser 550 and periodically removed.

Heat is directly introduced into the frozen powder using an electromagnetic radiation source 537 to create an electromagnetic field 538 in the interior of the vacuum drying chamber 580, causing dielectric heating of solvent in the frozen product and initiating sublimation. The electromagnetic field may be an infrared field, a microwave field or another field comprising electromagnetic waves.

Unlike the system 200 shown in FIG. 2, the system 500 shown in FIG. 5 includes an electromagnetic radiation source 537 located within the vacuum drying chamber 580. By placing the electromagnetic radiation source 537 within the drying chamber, a large proportion of the radiated energy is used in the dielectric heating of the frozen product, enhancing process efficiency. Further, losses associated with waveguides are eliminated. There is additionally a reduced need for waveguide components as compared to an externally mounted electromagnetic radiation source.

Locating the electromagnetic radiation source 537 within the vacuum drying chamber 580 additionally permits better tuning of the radiation wavelength to selectively heat the frozen product without excessively heating components within the vacuum drying chamber. Factors that would otherwise require compromise in tuning of the radiation wavelength, such as penetration of the waves through walls of the vacuum drying chamber and performance of the waveguides, are greatly reduced.

In the case of an electromagnetic field 538 in the microwave spectrum, the electromagnetic radiation source 537 may be a magnetron vacuum tube comprising a cavity anode, a central cathode and an electromagnet. The microwave spectrum is generally defined as that portion of the electromagnetic spectrum having wavelengths between 1 millimeter and 1 meter. Embodiments of the present specification utilize microwaves having a wavelength near 120 mm, which maximizes dielectric heating of water molecules. Waveguides (not shown) may be provided to direct the electromagnetic radiation within the drying chamber 580 to heat the frozen product and cause sublimation of the solvent. The electromagnetic field 538 offers an effective approach to shortening the drying cycle and potentially making the process continuous.

The electromagnetic field 538 may alternatively be radiation in the infrared spectrum. Infrared radiation is electromagnetic radiation having longer wavelengths than those of visible light, extending from the nominal red edge of the visible spectrum at 700 nanometers to about 1 mm. The electromagnetic radiation source 537 may be a radiant infrared heater using a metallic or ceramic element.

As the frozen powder is subjected to the electromagnetic field 538, an agitating mechanism 539 moves the particles within the drying chamber 580 relative to each other and relative to the electromagnetic field. The agitation provides for improved heat and mass transfer while also preventing agglomeration. By moving the product with respect to the electromagnetic field, the effects of an uneven electromagnetic field, "hotspots" and standing waves in the field are reduced.

Subjecting a bulk product to microwave energy while moving it through a drying chamber on belt conveyors has been suggested (see U.S. Pat. No. 4,033,048). Belt conveyors, however, cannot be adequately sterilized for pharmaceutical applications, and the required bearings are not typically suitable for use in a sterile vacuum environment. Because the belts and bearings involve frictionally sliding and rolling components, they produce small particles that are not acceptable in a sterile environment. Belt conveyors additionally do not continuously agitate the bulk product as it is being transported on the belts; instead, particles of the bulk product remain static relative to the belt and to each other as they are transported on the belt.

The freeze drying system 500 shown in FIG. 5 utilizes an agitating mechanism comprising a vibrating element 539 and a series of shelves 545. In the embodiment shown in FIG. 5, the shelves 545 are mounted directly to walls of the drying chamber 580, and the vibrating actuator imparts vibrations to the walls and the shelves. The shelves, which may be constructed with smooth, exposed, corrosion-resistant surfaces, are inside the vacuum drying chamber where they may be sterilized. The vibratory actuator 539, which may include pneumatic, hydraulic, electromagnetic or electronic components having enclosed, porous or convoluted surfaces, is outside the vacuum dryer and need not be sterilized.

The vibrating shelves 545 may alternatively be supported within the vacuum drying chamber 580 in a way that isolates the vibrations from walls of the vacuum drying chamber. For example, in an embodiment shown in FIG. 5a, the shelves are supported by a shelf support member 547 that is isolated from the vacuum drying chamber 580 by supporting springs 585. The supporting springs 585 may be leaf springs, coil springs or another design, and are sterilizable together with the shelf support member 547 and the shelves 545. The vibrating element 549 is mounted externally to the vacuum drying chamber 580 and is mechanically connected to the shelf support member 547 via a mechanical vibration linking member 571 that transmits the vibrations generated by the vibrating element 549. A bellows 572, such as a stainless steel bellows, may be used to maintain vacuum in the chamber 580 and to aseptically isolate the vibrating element 549 from the interior of the chamber.

Figure 5A:
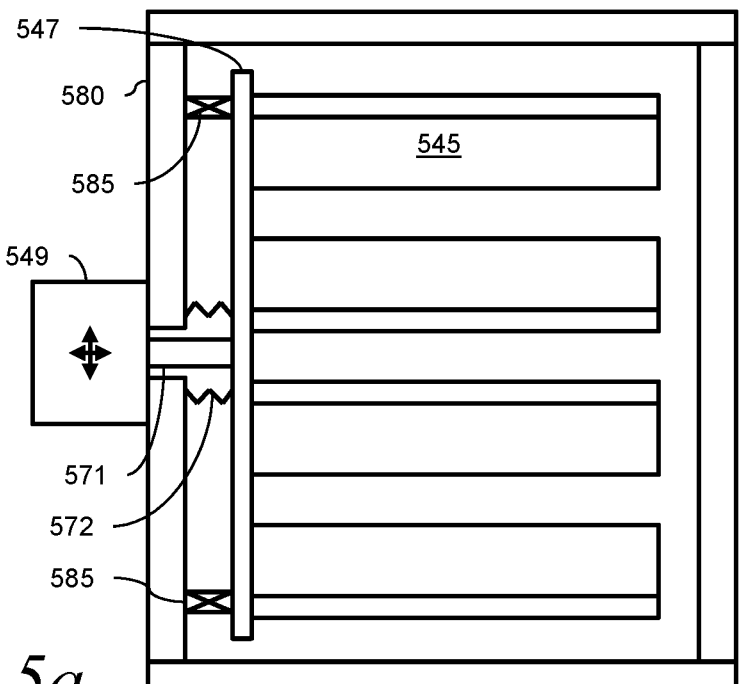
FIG. 5a is a schematic drawing of a mechanical vibrating shelf arrangement according to one aspect of the disclosure.

While the arrangement of FIG. 5a is shown with a single shelf support member 547 for supporting all the shelves 545, other arrangements are possible. For example, individual shelf support members and individual vibrating elements 549 may be used for vibrating each shelf 545, with corresponding mechanical vibration linking members and bellows.

Figure 5B:
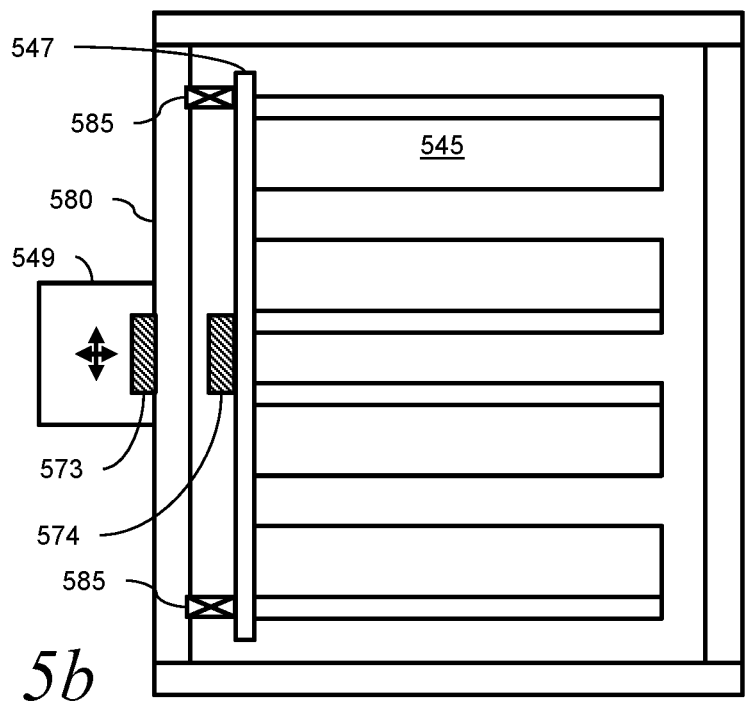
FIG. 5b is a schematic drawing of a magnetic vibrating shelf arrangement according to one aspect of the disclosure.

In another embodiment shown in FIG. 5b, the shelf supporting member 547 is linked magnetically to the vibrating element 549 using magnetic elements 573, 574. In such an arrangement, vibration of the magnetic element 573 by the vibrating element 549 induces vibration of the magnetic element 574, which is attached to the shelf supporting member 547. Because the magnetic field traverses a wall of the chamber 580, there is no need for an aperture in the wall, or for a bellows as in the arrangement of FIG. 5a.

Returning to FIG. 5, the shelves 545 are arranged serially with a top shelf receiving the frozen product from the passageway 581. Each shelf may be moderately inclined so that vibration of the shelf causes the frozen product to advance along the shelf. In an exemplary arrangement, the shelves are inclined more than 5 degrees to the horizontal. In a more preferred arrangement, the inclination of the shelves is between 8 and 12 degrees from the horizontal. An inclination of between 9 and 10 degrees is currently most preferred. The shelves are arranged so that the frozen product, upon reaching the lowest point on a given shelf, drops to a succeeding shelf and repeats the process.

As the frozen product is advanced along a shelf by gravity and vibration, product particles are moved by the vibration with respect to each other and to the shelf. In that way, the frozen product is continuously rearranged throughout its depth, presenting different particles on the face of the frozen product bed. The continuous rearrangement of frozen product particles aids in the even, continuous application of electromagnetic energy to the product.

The shelves 545 of the agitating mechanism are within a sterile environment such as that used in freeze drying pharmaceutical products. To that end, the shelves 545 are easily sterilized between cycles using sterilizing agents or heat, and have no elements within the drying chamber that are difficult or impossible to sterilize such as bearings, motors, chains, sprockets, belts, etc. The shelves furthermore do not involve frictional sliding or rolling movement among exposed components and therefore do not generate excessive metallic or other particles that are unacceptable in an aseptic process.

A sterilization system for sterilizing the interiors of the freezing chamber 510 and the vacuum drying chamber 580 may include sterilizing agent spray nozzles similar to the nozzle 218 shown in FIG. 2. Multiple nozzles may be used. In one example, one or more hot water cleaning nozzles are configured for spraying sterilized hot water on components within the freezing chamber and drying chamber, while the same or additional nozzles are used for steam drying the components.

Figure 7:
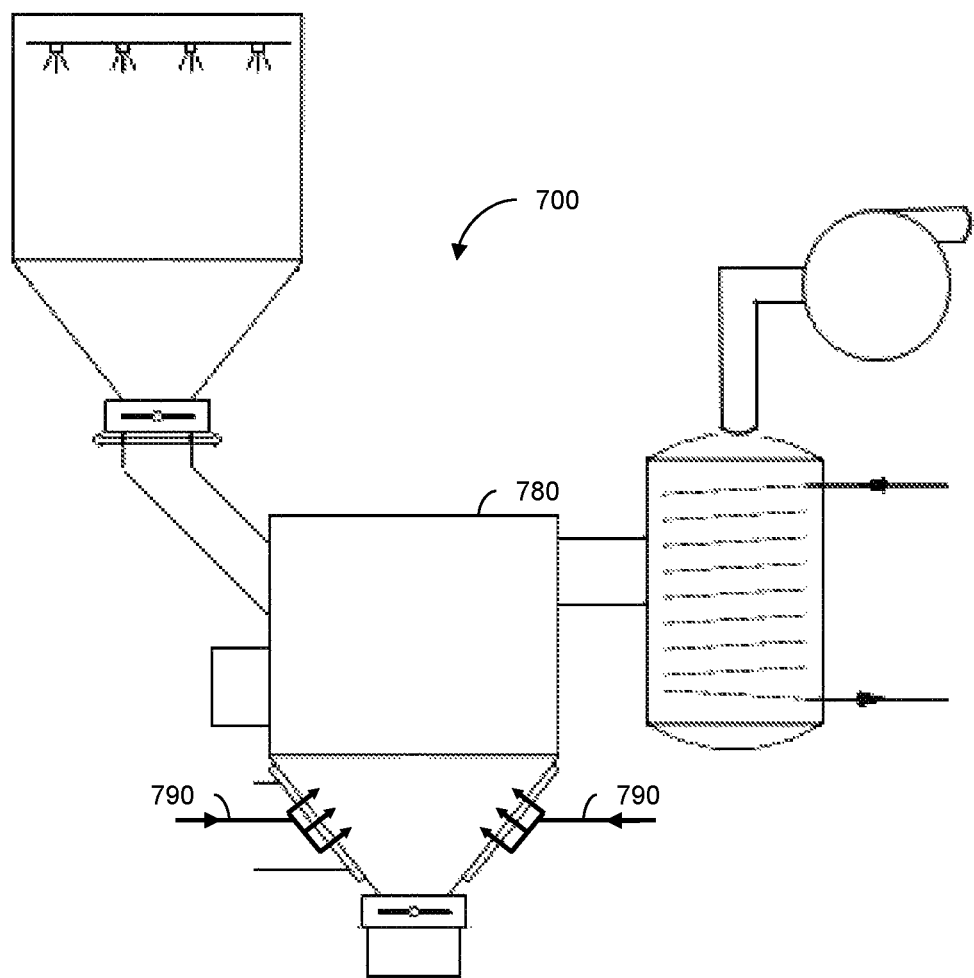
FIG. 7 is a schematic drawing of a freeze drying system according to one aspect of the disclosure.

In another example, agitation is performed by introducing a sterile gas such as sterile nitrogen into the product to create a fluidized bed and circulate the product. As with embodiments using agitation by vibration, all components within the vacuum drying chamber may be sterilized via steam, VHP, or other known sterilizing agents. The fluidized bed of frozen product may be created in a region at the bottom of the vacuum drying chamber 780, shown in FIG. 7, or may be created on the shelves 538 (FIG. 5) to cause the product to flow from shelf to shelf and to cause particles of the product to move relative to each other in the product bed. The sterile gas may be introduced into the spray-frozen product bed through nozzles of a sterile gas introduction system 790, as shown in the system 700 of FIG. 7.

In another embodiment, the vibration actuator 539 is used without the shelf arrangement shown in FIG. 5. The actuator induces vibrations in the wall of the drying chamber 580, causing a bed of spray-frozen powder at the bottom of the chamber 580 to circulate toward and away from the chamber wall.

The continuous movement of the product within the product bed thickness insures uniform drying across the product thickness. Each of the above-described agitation mechanisms continuously moves product toward and away from the surface of the product bed, and continuously moves particles of the frozen product relative to each other. The product is continuously moved or circulated to changing depths within the product thickness. Because the penetration of the electromagnetic waves into the product is dependent on thickness, and because the electromagnetic field may be non-uniform, a continuously agitated drying bed is more efficient and produces a more uniform result.

Figure 6:
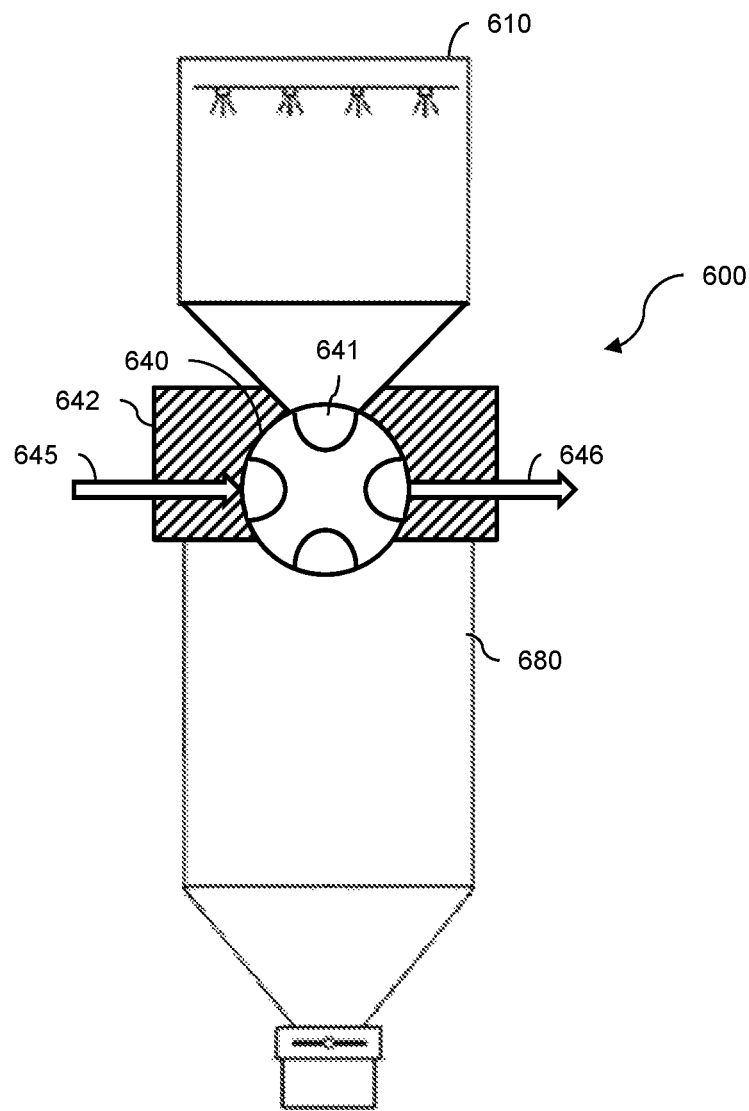
FIG. 6 is a schematic drawing of a product transfer system according to one aspect of the disclosure.

Upon completion of the drying operation, the vessel is returned to atmospheric pressure and a valve 545 at the bottom of the drying chamber opens to allow the product to be removed. Alternatively, a sealing arrangement similar to the arrangement 600 shown in FIG. 6 may be used to continuously unload freeze-dried product from the vacuum dryer without interrupting the drying process.

While the system 500 of FIG. 5 includes a single drying chamber 580, multiple drying chambers such as those depicted in the system 300 of FIG. 3 may be incorporated. Each drying chamber may have an electromagnetic radiation source 537 and may be connected to the freezing chamber 510 via a separate passageway 581 and valve 582. In that case, the freezing chamber 510 may be operated substantially continuously, with drying cycles at various stages taking place in the multiple drying chambers.

The use of a drying vessel 580 that is separate and isolated from the freezing vessel 510 permits the two vessels to be designed specifically for their particular purposes under appropriate pressure and temperature conditions, without compromise. Further, both vessels may be used in parallel, substantially increasing efficiency of the process. Moreover, such a design allows easier scale-up for larger batches with uniform product characteristics and simple product handling.

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A freeze drying system for freeze drying a bulk product, comprising:
    a freezing chamber;
    at least one spray nozzle directed to an interior of the freezing chamber, the at least one spray nozzle being connected for spraying the bulk product and a freezing agent to create a spray-frozen powder;
    a vacuum drying chamber;
    a connection between the freezing chamber and the vacuum drying chamber for transferring the spray-frozen powder and for pressure isolation of the freezing chamber from the vacuum drying chamber;
    an agitating mechanism for agitating the spray-frozen powder in the vacuum drying chamber by continuously moving particles of the spray-frozen powder relative to adjacent particles, the agitating mechanism including a plurality of inclined shelves arranged within the vacuum drying chamber in a series for conducting the spray-frozen powder from inclined shelf to inclined shelf, a shelf support member supporting at least two of the plurality of inclined shelves, and a vibrating mechanism located outside the vacuum drying chamber and linked to the shelf support member for transmitting vibrations via the shelf support member to the at least two inclined shelves to transport the spray-frozen powder relative to the at least two inclined shelves, the vibrations being isolated from the vacuum drying chamber;
    a heat source for heating the spray-frozen powder;
    a sterilization system for sterilizing components of the agitating mechanism within the vacuum drying chamber; and
    a vacuum pump connected for evacuating the vacuum drying chamber.

2. The freeze drying system of claim 1, wherein each inclined shelf of the plurality of inclined shelves is inclined more than 5 degrees from horizontal.

3. The freeze drying system of claim 1, wherein the vibrating mechanism is linked magnetically to the shelf support member.

4. The freeze drying system of claim 1, wherein the vibrating mechanism is linked to the shelf support member by a mechanical link extending from the vibrating mechanism to the shelf support member, the mechanical link being isolated from the vacuum drying chamber by a bellows.

5. The freeze drying system of claim 1, wherein the sterilization system comprises:
    at least one hot water cleaning nozzle configured for spraying sterilized hot water on at least the components of the agitating mechanism within the vacuum drying chamber; and
    at least one steaming nozzle for steam drying at least the components of the agitating mechanism within the vacuum drying chamber.

6. The freeze drying system of claim 1, wherein the connection further comprises:
    a rotatable transfer disk forming a pressure seal between the freezing chamber and the vacuum drying chamber, the transfer disk having on its periphery at least one product transfer cavity alternately exposed to the freezing chamber and the vacuum drying chamber upon rotation of the rotatable transfer disk;
    a pressurization channel intermittently in communication with the at least one product transfer cavity to pressurize the cavity before exposure to the freezing chamber; and
    an evacuation channel intermittently in communication with the at least one product transfer cavity to evacuate the at least one product transfer cavity before exposure to the vacuum drying chamber.

7. The freeze drying system of claim 1, further comprising a controller including memory storing a program that, when executed by the controller, causes the freeze drying system to perform:
    an aseptic spray freezing operation wherein the bulk product and the freezing agent are sprayed from the at least one spray nozzle, to produce the spray-frozen powder in the freezing chamber at a first pressure;
    a transfer operation wherein the spray-frozen powder is transferred to the vacuum drying chamber via the connection;
    an aseptic vacuum freeze drying operation wherein the vacuum pump evacuates the vacuum drying chamber to a vacuum pressure lower than the first pressure, the heat source heats the spray-frozen powder within the vacuum drying chamber and the agitating mechanism agitates the spray-frozen powder, and a sterilization operation wherein the components within the vacuum drying chamber are sterilized by the drying chamber sterilization system.

8. The freeze drying system of claim 7, wherein the aseptic spray freezing operation and the aseptic vacuum freeze drying operation are performed concurrently.

9. The freeze drying system of claim 1, wherein the heat source comprises a magnetron for emitting electromagnetic radiation in the microwave spectrum.

10. The freeze drying system of claim 1, wherein each one of the at least one spray nozzles is both connected to a bulk product source and connected to a freezing agent source for spraying both the bulk product and the freezing agent together from each nozzle in direct contact.

11. The freeze drying system of claim 1, wherein the at least one spray nozzle comprises at least one nozzle connected for spraying only the bulk product and at least one nozzle connected for spraying only the freezing agent.

12. The freeze drying system of claim 1, further comprising:
a condensing chamber interposed between the vacuum drying chamber and the vacuum pump and comprising surfaces for condensing a vapor from exhaust gas received from the vacuum drying chamber.

13. The freeze drying system of claim 1, further comprising:
a plurality of vacuum drying chambers;
a plurality of connections, each connecting one of the plurality of vacuum drying chambers with the freezing chamber.

14. The freeze drying system of claim 1, wherein the heat source is for dielectrically heating the spray-frozen powder to cause sublimation of a frozen liquid.

15. The freeze drying system of claim 14, wherein the heat source is a dielectric heat source located within the vacuum drying chamber.

16. A method for freeze drying a bulk product containing a liquid, comprising:
spraying the bulk product and a freezing agent into a freezing chamber, the freezing chamber being at a first pressure, the freezing agent intermingling with the sprayed bulk product to freeze the liquid contained in the bulk product to form a spray-frozen powder in the freezing chamber;
transferring the spray-frozen powder from the freezing chamber to a plurality of shelves arranged serially in a vacuum drying chamber;
subjecting the vacuum drying chamber to a vacuum pressure lower than the first pressure;
agitating the spray-frozen powder under the vacuum pressure in the vacuum drying chamber to continuously move particles of the spray-frozen powder relative to adjacent particles, the agitating including vibrating the plurality of shelves using a vibrating mechanism located outside the vacuum drying chamber, at least two of the plurality of shelves being supported by a shelf support member, the vibrating mechanism being linked to the shelf support member for transmitting vibrations via the shelf support member to the at least two shelves, the vibrations being isolated from the vacuum drying chamber, the vibrating mechanism causing the spray-frozen powder to advance along a given shelf of the plurality of shelves and drop to a succeeding shelf of the plurality of shelves;
during the agitating the spray-frozen powder under the vacuum pressure in the vacuum drying chamber, heating the spray-frozen powder to cause sublimation of frozen liquid to form a freeze dried product;
removing the freeze dried product from the vacuum drying chamber; and
sterilizing components within the vacuum drying chamber.

17. The method of claim 16, wherein transferring the spray-frozen powder to a plurality of shelves comprises transferring the spray-frozen powder to a plurality of shelves each having an inclination of more than 5 degrees from horizontal, the inclination of the shelves causing the spray-frozen powder to advance.

18. The method of claim 16, wherein vibrating the plurality of shelves further comprises:
using a vibrating mechanism linked magnetically to the shelf support member.

19. The method of claim 16, wherein vibrating the plurality of shelves further comprises:
using a vibrating mechanism linked to the shelf support member by a mechanical link extending from the vibrating mechanism to the shelf support member, the mechanical link being isolated from the vacuum drying chamber by a bellows.

20. The method of claim 16, wherein sterilizing components within the vacuum drying chamber further comprises:
spraying sterilized hot water on the components within the drying chamber; and
steam drying the components within the drying chamber.

21. The method of claim 16, wherein transferring the spray-frozen powder from the freezing chamber to a vacuum drying chamber further comprises:
transferring a quantity of the frozen product from the freezing chamber into a product transfer cavity of a transfer disk forming a pressure seal between the freezing chamber and the vacuum drying chamber, the product transfer cavity being alternately exposed to the freezing chamber and the vacuum drying chamber upon rotation of the transfer disk;
rotating the product transfer disk;
reducing a pressure of the product transfer cavity between exposure to the freezing chamber and exposure to the vacuum drying chamber; and
transferring the quantity of the frozen product from the product transfer cavity of the transfer disk into the vacuum drying chamber.

22. The method of claim 16, wherein spraying the freezing agent comprises spraying sterile liquid nitrogen.

23. The method of claim 16, wherein:
transferring the spray-frozen powder from the freezing chamber to a vacuum drying chamber further comprises transferring to a plurality of vacuum drying chambers; and
wherein the subjecting, agitating, heating, removing and sterilizing operations are performed in each of the plurality of vacuum drying chambers.

24. The method of claim 16, wherein heating the spray-frozen powder to cause sublimation of frozen liquid further comprises dielectrically heating the spray frozen powder.

25. The method of claim 24, wherein heating the spray-frozen powder further comprises:
using an electromagnetic radiation source located within the vacuum drying chamber.

26. The method of claim 24, wherein heating the spray-frozen powder to cause sublimation of frozen liquid to form a freeze dried product further comprises using electromagnetic radiation in the microwave spectrum.

27. The method of claim 24, wherein heating the spray-frozen powder to cause sublimation of frozen liquid to form a freeze dried product further comprises using electromagnetic radiation in the infrared spectrum.

* * * * *